US010967446B2

(12) United States Patent
Baratta (10) Patent No.: US 10,967,446 B2
(45) Date of Patent: Apr. 6, 2021

(54) APPARATUS AND METHODS OF PRODUCING A PLANAR MEMBER FROM PLANAR SECTIONS

(71) Applicant: BARON INVESTMENTS, LLC, Oxnard, CA (US)

(72) Inventor: Anthony Baratta, Oak Park, CA (US)

(73) Assignee: BARON INVESTMENTS, LLC, Oxnard, CA (US)

( * ) Notice: Subject to any disclaimer, the term of this patent is extended or adjusted under 35 U.S.C. 154(b) by 529 days.

(21) Appl. No.: 15/125,175

(22) PCT Filed: Mar. 10, 2015

(86) PCT No.: PCT/US2015/019787
§ 371 (c)(1),
(2) Date: Sep. 11, 2016

(87) PCT Pub. No.: WO2015/138509
PCT Pub. Date: Sep. 17, 2015

(65) Prior Publication Data
US 2017/0072484 A1    Mar. 16, 2017

Related U.S. Application Data

(60) Provisional application No. 61/951,519, filed on Mar. 11, 2014.

(51) Int. Cl.
*B23D 61/02* (2006.01)
*B23D 65/00* (2006.01)

(52) U.S. Cl.
CPC .......... *B23D 61/026* (2013.01); *B23D 65/00* (2013.01)

(58) Field of Classification Search
CPC ..... B23D 61/026; B23D 65/00; B23D 61/025
See application file for complete search history.

(56) References Cited

U.S. PATENT DOCUMENTS 101,942 A    4/1870   Taylor
1,306,741 A * 6/1919  Blandchard .......... B23D 61/026
                                              76/112
(Continued)

FOREIGN PATENT DOCUMENTS

CA        2010229 A1    8/1990
DE    102008034206 A1   1/2010
(Continued)

OTHER PUBLICATIONS

Hackworth, Joshua, International Search Report of the International Search Authority, dated Apr. 27, 2015, 6 pages, PCT/ISA Australian Patent Office.

(Continued)

*Primary Examiner* — Omar Flores Sanchez
(74) *Attorney, Agent, or Firm* — Henricks Slavin LLP (57) ABSTRACT

A laminar is formed from a plurality of sections, where in one example, one or more of the sections are selected to have a configuration according to a known parameter or characteristic of the section, for example material characteristics. One or more sections are cut from a raw material or stock material according to the known parameter or characteristic, which for example can be a known characteristic of the stock material such as roll direction.

44 Claims, 5 Drawing Sheets (56) References Cited

U.S. PATENT DOCUMENTS

| | | | |
|---|---|---|---|
| 2,690,632 A | | 10/1954 | Sevick |
| 2,758,369 A | | 8/1956 | Altwicker |
| 4,232,580 A | | 11/1980 | Stewart |
| 4,570,517 A | * | 2/1986 | Souza ................ B23D 61/026 83/666 |
| 5,027,684 A | * | 7/1991 | Neukam ............. B23D 61/026 83/481 |
| 5,408,983 A | | 4/1995 | Sawluk |
| 5,411,010 A | | 5/1995 | Mummenhoff |
| 5,465,706 A | | 11/1995 | Sawluk |
| 6,526,959 B1 | | 3/2003 | Lee et al. |
| 2003/0213483 A1 | | 11/2003 | Sakarcan |
| 2008/0173293 A1 | | 7/2008 | Baratta |
| 2008/0251061 A1 | | 10/2008 | Baratta |

FOREIGN PATENT DOCUMENTS

| | | |
|---|---|---|
| JP | 7-55452 B2 | 6/1995 |
| JP | 3136276 | 2/2001 |
| SU | 1252172 A1 | 8/1986 |
| WO | WO 2002/064334 | 8/2002 |

OTHER PUBLICATIONS

Hackworth, Joshua, Written Opinion of the International Search Authority, dated Apr. 27, 2015, 9 pages, PCT/ISA Australian Patent Office.

Chariot, David, Extended European Search Report, dated Sep. 21, 2017, 9 pages, European Patent Office, Munich, Germany.

\* cited by examiner

APPARATUS AND METHODS OF PRODUCING A PLANAR MEMBER FROM PLANAR SECTIONS

CROSS REFERENCE TO RELATED APPLICATIONS

This application is a National Stage of International Application No. PCT/US15/19787, filed Mar. 10, 2015, which claims priority to U.S. 61/951,519, filed Mar. 11, 2014, the entire contents of which are incorporated herein by reference.

BACKGROUND

Field

These inventions relate to methods and apparatus for producing a planar member from sections, in some examples from planar sections, for example a planar working tool from planar sections, and in one example a core for a cutting blade, for example for wood or concrete or stone, such as where a layer of the core is formed from a plurality of sections, which may include planar sections or non-planar sections, and the layer may also be an external layer or an external structural layer.

SUMMARY

In one example of a working element, such as a moving tool, for example a blade core, a portion of the core may be divided into sections. The sections may form a layer of the core. With the sections, for example sections to form an outer or inner layer, lamina or sheet, the stresses, or the strengths or weaknesses, in a given section can be oriented in a known configuration, and all of the sections can be oriented in identical ways relative to respective reference points or reference lines (hereinafter sometimes referred to as tool reference). Tool reference lines can be based on a reference derived from a motion characteristic of the tool or a geometric characteristic of the tool. For example, in a rotating or pivoting tool, such as a circular saw blade, grinder, or the like, the tool reference line can be the axis of rotation, or a secondary tool reference line based on the axis of rotation/pivoting, for example a radius, in which case the axis can be a primary reference and the radius can be a secondary reference.

For a selected reference, all of the sections can be oriented in identical ways relative to the reference. For example, where the reference is a secondary reference of a radius for a rotating or pivoting tool, sections can be oriented in identical ways relative to a respective radius. In one configuration, each section can be selected to have a desired orientation and configuration relative to the raw material from which it is obtained, and that orientation can be applied to and positioned on the core so that the orientation is parallel to a respective radius on the tool, for example on a blade. In one example, a layer of the core can be divided into five sections. Each section is obtained from a raw material, such as a sheet of roll-formed steel or fiber-reinforced composite, having a known orientation for strength, for example the longitudinal direction of roll when the steel was formed or a fiber orientation. Each section is cut or taken from the raw material, for example sheet, in such a way that they all have a known axis or orientation of strength (or other parameter) that is the same for all of the sections. In one example, the geometry is selected so that the orientation of strength in the section will be parallel to a radius of the blade when the section is in position on the core. In another example, the orientation of the section is selected so that the direction of strength is non-parallel to a radius on the core when the section is in place on the core. In another example, sections are produced from the raw material and positioned to form a layer for a core without regard to the strength direction, direction of roll or other parameter or characteristic. Additionally, the sections can have identical geometries or they can be different in one or more ways. For example, a given section need not extend a complete dimension of the core, such as a complete radius, but can be other than a complete radius. Where two sections have different geometries, they can be configured to have the same orientation relative to a known strength or other parameter, or they can be oriented otherwise. In an example (A), the same orientation relative to a known strength or other parameter, positioned together in or on a tool in an identical way relative to a respective reference, tends to make the layer more orthotropic, compared (B) for example to a monolithic layer in or on the tool, compared (C) for example to selecting sections without regard to section strength or other parameter but positioning them identically relative to a tool reference, or compared (D) for example to selecting sections based on section strength or another parameter but positioning them differently relative to a tool reference. Examples A and C-D are considered to make a layer more orthotropic, to a greater or lesser extent, than the example B of a monolithic layer because the monolithic layer has the anisotropic characteristics fixed while the other examples either randomize the anisotropic characteristics or balance or cancel them out. Therefore, it is believed that each of the examples A and C-D represent improvements over a monolithic layer of example B.

In another configuration of a core, such as one formed from lamina or sheets of material, a sheet forming a portion of the core can be separated or divided into sections. In one configuration, each section has an identical geometry to those of the other sections. The sections are arranged to form a layer for a core, for example for a circular cutting blade, and a layer may be formed from an even number or an odd number of sections. In one example, the layer is formed from an odd number of sections, to reduce the possibility of resonance or other forms of vibration, for example that may arise in circular cores. In a further example of a core formed from a sheet or layer having a plurality of sections, the sections are positioned adjacent one another where adjacent edge surfaces are spaced apart from each other. In one example, the spacing between adjacent edges of adjacent sections is uniform along the adjacent edges, and in one example, the spacing is approximately 0.005 inch. In another example, the spacing may vary, for example as a function of anticipated thermal ranges to which the region is exposed and/or as a function of anticipated thermal material expansion. For example, the spacing can increase with distance from the center, or decrease from the center and then increase toward the outer perimeter, for example if heat was expected at the center and also at the perimeter (such as from cutting operations). In another example, the edges of each section are formed with a uniform surface, for example a straight edge, a curved edge or the like. In another example, adjacent edges have complementary geometries, for example, straight edges, curved edges, sinusoidal edges, sawtooth edges, or nonuniform edges that follow a complex profile.

In another example of a layer for a core formed from a plurality of sections, for example for a cutting blade, the core can be formed from a plurality of sheets or layers, wherein each layer is formed from a plurality of sections, including the layers that are outer-most layers or at least outer-most structural layers. In an example of a circular core, two layers can be secured together, for example by adhesive, fasteners, rivets, welding, and/or other fastening means. The layers can be immediately adjacent each other, or separated by one or more intermediate layers, which may be adhesive, structural layers such as steel or other metals, composites, or other materials. Additionally, a sectioned layer may have a further layer forming a core on one side of the sectioned layer or on both sides of the section layer. Adjacent layers can be sectioned or solid (monolithic). In one example, where a rotating disc, for example a cutting blade core, has a plurality of layers wherein at least two of the layers are sectioned layers, the junction lines or adjacent edges for adjacent sections in one layer may coincide with the junction lines or adjacent edges for adjacent sections in another layer, for example over their entire length, may cross over each other one or more times, or may not overlap at all.

In one example for a circular tool, sections may be pie shaped with radial side edges and arcuate perimeter edges, or the side edges can be arcuate and the perimeter edge arcuate as well. Perimeter edges can be arcuate to approximate part of a circle, straight, curved with a defined form (for example, sinusoid, saw tooth, etc.), or have a complex shape. In one configuration, all sections forming a layer have identical geometries. Alternatively, one or more sections in a layer can have geometries different from the remaining sections in the layer. In a further configuration, each section can have curved side edges and perimeter edge, where the side edges and/or the perimeter edge have identical radii of curvature. Identical radii of curvature permit improved material usage when the sections are cut from a linear sheet. For example, having side edges or both side edges and perimeter edges with identical radii of curvature allow sections to be cut in such a way that adjacent sections removed from a sheet are cut in a single pass, known as a common cut or using common cut lines. Nesting software for cutting of patterns can take advantage of common cut lines when cutting components from a sheet.

In an example of a rotating disc, for example a cutting blade, formed from a plurality of layers, two or more of the layers may be formed from a plurality of sections. For one sectioned layer, each section may be asymmetric relative to an axis in the section parallel to a plane of the section. In one example, opposite edges of the section may be curved, and the sections of a given layer arranged so that the curvature extends in a counterclockwise direction when viewing a side of the core, or a clockwise direction, as desired. The sections on the second layer can be formed from sections of material having geometries different than the sections of material in the first layer. Alternatively, the sections in the second layer can have geometries that are identical to the geometries of the sections in the first layer. In an example where all of the geometries are identical, the sections of the second layer can be positioned so that they are mirror images of the sections in the first layer. Alternatively, the sections in the second layer can be positioned so that they are not mirror images of the sections in the first layer. In one example of a non-mirror image configuration, the sections in the first layer can have non-straight side edges, which are oriented to be directed in a counterclockwise direction, for example, such as when viewing the disc along an axis in a given direction relative to the core or disc. The sections in the second layer can be oriented so that their side edges are directed so as to extend in a clockwise direction, when facing the first and second discs or layers in the same axial direction. In other words, in the example described in the preceding sentence, the sections of the first layer have their side edges directed counterclockwise when viewed in the direction of the axis for the core or disc, and when the core is turned around to view the second layer when the two layers are assembled on the core, the side edges of the sections in the second layer are also directed in a counterclockwise direction, or a reverse mirror image.

Adjacent sections in a layer, such as those described herein, can be arranged to have a known spacing between them. In one example, the spacing can be as little as 0.005 inch or less. The spacing between adjacent sections can be a function of tool geometry and size, for example blade core or overall blade diameter in a circular saw blade. In the present example of 0.005 inches, the core diameter is 20.30 inches. Therefore, in the present example, the spacing between any given adjacent pair of sections is selected to be about 0.02% of the core diameter, with the spacing being constant from the center to the perimeter for any given diameter of core. However, the spacing may also vary as a function of distance from the center or other reference point. The sum of the spacings or gap widths between adjacent sections over a complete layer can be selected to reduce or eliminate the possibility of one section contacting an adjacent section during expected operating conditions, for example whether actual conditions or theoretical maximum conditions. For example, spacings or gap widths may be selected to accommodate thermal expansion, or other effects, and in one example spacings or gap widths may be selected to minimize the possibility that any one section will contact an adjacent section due to thermal expansion over selected operating conditions, such as known or maximum operating conditions. In one configuration, the sections are intended to remain thermally isolated from one another, and the sections can be configured to reduce any effects of thermal variations in operation. Smaller section sizes, for example, can reduce the effects of heat on sections in the layer, for example by reducing effects of temperature on any one section, such as from thermal expansion. In other examples, spacings can be on the order of hundredths of inches, tenths of inches or an inch or more. With larger spacings, other elements or components can be included in the spacing, for example additional adhesive, fluid flow lines, or structural or operating components.

With a spacing between adjacent sections, tension or stress inherent in a given section is not transferred to adjacent sections. Any such tensions or stresses can be designed to be absorbed or accounted for in the rest of the assembly. For example, such stresses or tensions can be absorbed or accommodated in adhesive used to assemble the disc or core or other tool or component. Consequently, the strength and the integrity of the assembly can be derived in part from a combination of the adhesive, other layers, individual sections, and the orientation of individual sections either alone or in combination with the orientations of other sections both in the same layer, and also in other layers, if any. Moreover, it is believed that strength and integrity of the assembly is improved when individual sections of the layer, which are positioned or oriented as a function of a section reference such as a parameter or characteristic of the section, are consistently positioned or oriented in the layer as a function of that parameter or characteristic and as a function of a tool reference, such as a radius (secondary tool reference for a circular core). In one example, where an individual section is oriented in a layer according a section reference, for example according to a strength direction (for example, an orientation determined as a function of the roll direction of a steel sheet), all of the sections in the layer can be oriented in like manner, according to the section reference, and in the present example a strength direction, as a function of respective radii. For example, if the strength direction of a given section in a circular core is oriented radially or along an axis or other reference, the strength direction of each of the other sections in the layer can also be oriented radially relative to the axis of rotation of the core or along an axis or other reference. If other layers have sections selected or formed in a like manner (according to a section reference), the sections in the layer can be oriented similarly consistently (according to a tool reference). Additionally, where multiple layers have sections oriented consistently according to the same parameter or characteristic, the section orientation in one layer can match the section orientation in another layer. Alternatively, the section orientation in one layer can be complementary to the section orientation in another layer, or the section orientation in one layer can be different from the section orientation in another layer. Complementary section orientation in one layer can exist where the sections (or characteristics or parameters of sections) are oriented, for example along a chord in one direction of a circular core, and the section orientation in another layer may be along a chord in an exactly opposite direction, or a non-complimentary orientation, where the chords of facing sections in different layers are at angles with respect to each other.

Selecting sections for a layer and orienting them, whether or not orienting them according to a selected parameter (section reference), reduces the possibility that one portion of a core is weaker or stronger than another portion of the core. Orienting a section according to a selected parameter (whether strength or another parameter) can enhance or improve the benefits obtained by orientation, but it is understood that consistently orienting more than one of multiple sections into a layer according to a criterion improves the characteristics of the laminar assembly, for example a blade or other working tool. Consistency tends toward a more orthotropic assembly, and when all sections are oriented according to the same parameter (consistency, whether by section reference, tool reference or both), smaller section sizes also tend toward a more orthotropic assembly for a given layer.

In another configuration, a core, for example a core of a disc, for example a cutting blade core, can be formed from a plurality of layers, wherein at least two of the layers are formed from respective assemblies of laminar sections. In an example where the sections are asymmetric about at least one axis in a plane of each section, the sections in one layer can be oriented in a given configuration, and the sections in the second layer can be oriented in the same configuration, but shifted. With a shifted configuration, as with any configuration of multiple layers, additional fastening configurations can be used beyond adhesive. For example, rivets can be used for example at a perimeter, in a center area or in between, to help secure the sections in place on the disc. For example, sections of one layer can be configured to have adjacent edges extending in a counterclockwise direction, as seen when one faces the layer, and when the core is turned around so the viewer can face the other layer, sections of identical configurations with those of the first layer are oriented so that their adjacent edges extend in a counterclockwise direction or in some configurations, tips of a section on the first layer may overlap tips of a section on the second layer, and such tips can be riveted or otherwise fastened together in addition to or in place of adhesive.

In one configuration of a laminate of a plurality of layers formed from sections arranged in respective planes to form the layer, it may be desired to improve or increase the overlap of sections from one layer over sections from another layer.

In another example of a core for a tool, such as a core for a disc, for example for a cutting blade, sections formed from anisotropic materials can be configured to form an orthotropic assembly or one tending toward a more orthotropic assembly. Such an assembly can be stronger, and have greater structural integrity, than a structure formed from a plurality of anisotropic sections assembled into one or more layers, which in turn can be stronger than a single layer, or multiple layers of un-sectioned components.

A method of manufacturing a core from multiple layers, may have one or more of the layers formed from sections. For a given layer, the layer may be formed from sections having identical geometries, and adjacent sections may be positioned with or without spacing between them. In an assembly of sections forming a layer, the layer can be formed from a metal material that is not tensioned.

In one example of a method of manufacturing a core for a tool, in one example for a blade, which could be a circular saw blade, the core can be formed from at least one layer composed of a plurality of sections forming the layer. The sections can be any of the sections described herein. The sections can be identical or different geometries formed from raw material, such as a sheet of raw material. In the example of circular saw blades, as well as other cutting tools, the raw material may be rolled steel in sheet form. The sections can have identical material properties, or one or more sections can have different material properties relative to the other sections. For example, different sections can be cut from different sheet stock, or they can be cut from the same sheet stock but one or more sections have material property orientations different than one or more other sections. For example, different sections can have strength directions or crystallinity different from each other. A core for a tool is then formed with a layer where the layer includes multiple sections arranged with respect to each other to form the core. Adjacent sections can be contacting each other, or adjacent sections can be spaced apart from each other, for example with a spacing described herein. In one example, one or more sections in the layer can be positioned in the layer according to a section reference, for example a material property of the section. In another example, one or more sections in the layer can be positioned in the layer according to a reference in the core, for example a longitudinal axis, an axis of rotation, a radius extending from an axis of rotation, or the like. In one example, all sections in a layer have a geometry selected and formed according to a section reference, for example crystallinity or strength direction, and the sections are arranged to have the same orientation relative to a reference in the core, in the example of a circular cutting blade relative to a radius. For example, all sections in a layer can be positioned so that a strength direction for the section is parallel to a respective radius of the core for which the layer is being formed.

In another example of a method of manufacturing a core for a tool, the core can be formed from a plurality of layers, at least one of which is composed of a plurality of sections forming a layer. Another of the layers can be a monolithic layer, can be a structural layer, an adhesive layer, or a protective layer, or another of the layers can be another layer composed of a plurality of sections forming such layer. In one example, a first layer formed from a plurality of sections has the sections arranged as a function of section arrangement of another layer. For example, sections in a first layer can be symmetric with respect to each other, and sections in a second layer can be asymmetric with respect to each other. By way of another example, sections in a first layer can be symmetric with respect to each other and sections in a second layer can also be symmetric with respect to each other, and the layers are arranged with respect to each other so that opposite sections overlap, or are not coincident. By way of a further example, sections in a first layer can be asymmetric, and sections in a second layer can be asymmetric, and the first and second layers positioned relative to each other so that facing or opposite sections are not coincident with each other, but instead overlap. In one example of a section overlap, a section in a first layer can overlap two sections in a second layer. In a further example of section overlap, a section in a first layer can overlap three sections in a second layer. In another example of section overlap, oppositely-facing sections are arranged so that their section properties are identical, for example extending in the same direction, such as radially outward.

In an example of a method of forming sections for a tool, raw material is selected and a material property or characteristic is identified in the material. In one example, the material property may be crystallinity, an anisotropic characteristic, a strength direction, or other property. One or more sections are then cut or removed or formed from the raw material and used to form a tool. In one example, sections are cut from the raw material where the sections are cut as a function of the material property. For example, sections are cut so that the material property extends in a direction substantially parallel to a longitudinal axis of the section, and in another example, sections are cut so that the material property extends in a direction substantially perpendicular to a longitudinal axis of the section. In one example, sections are cut to have identical geometries, and in a further example, sections are cut to have a plurality of arcuate edges wherein at least two of the arcuate edges have identical radii of curvature. In a further example, sections are cut to have three arcuate edges all having identical radii of curvature.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of tools and of methods of making and using the tools are described. Depending on what feature or features are incorporated in a given structure or a given method, benefits can be achieved in the structure or the method. For example, circular tools may be stronger, lighter weight, less expensive to manufacture and have a longer lifetime. Cutting tools may have improved noise and/or vibration characteristics and may be operated at higher speeds. Additionally, some cutting tool configurations may also benefit from lighter-weight components, lower-cost and reduced wear.

In tools similar to circular saw blade configurations, one or more aspects of the examples described may improve tool performance, for example better segment lifetime, and better feed rate. Additionally, blade core tensioning may be reduced or eliminated, and the blade core may be made lighter.

With one or more of the present configurations, laminar working tools can be improved where one or more of the layers are formed from sections (for example without regard to orientation as a function of a parameter or characteristic), or where one or more of the layers are formed from sections where the sections are formed according to a section reference, and/or where the sections are oriented according to a desired tool reference, such as a tool parameter. Where one or more of the layers are formed from sections without regard to a section reference, such as a section parameter, improvements are possible. Additionally, a layer formed from sections oriented as desired can be configured to counteract known deficiencies or characteristics in another layer. Furthermore, multiple layers of a laminar working tool can each be formed from sections oriented according to a selected section reference and/or a selected tool reference, for example a section references such as crystalline orientation, and can be made more flat originally and maintained more flat over a longer lifetime for the working tool. Such a laminar assembly, with appropriate fastening means such as an appropriate adhesive layer or layers in between, can be made more orthotropic than would otherwise be the case. With such configurations, the sections within a layer, and layers within an assembly are more balanced in their structural characteristics, including flatness, directionality, and strength. For example, for sections of a layer cut from a sheet of material, such as a sheet of rolled steel, where the sections have a known orientation, and wherein such sections are oriented in a known manner in the layer (according to both the section reference and the tool reference), the resulting layer may be more balanced.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the tools are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Saw blades are used as examples of a tool that can incorporate one or more of the features and derive some of the benefits described herein, and in particular concrete saw blades. Concrete saw blades often operate at elevated speeds, experience wear around the working or cutting portions of the tool, and are used for a number of applications. Tools other than cutting blades and equipment other than saws can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

Figure 1:
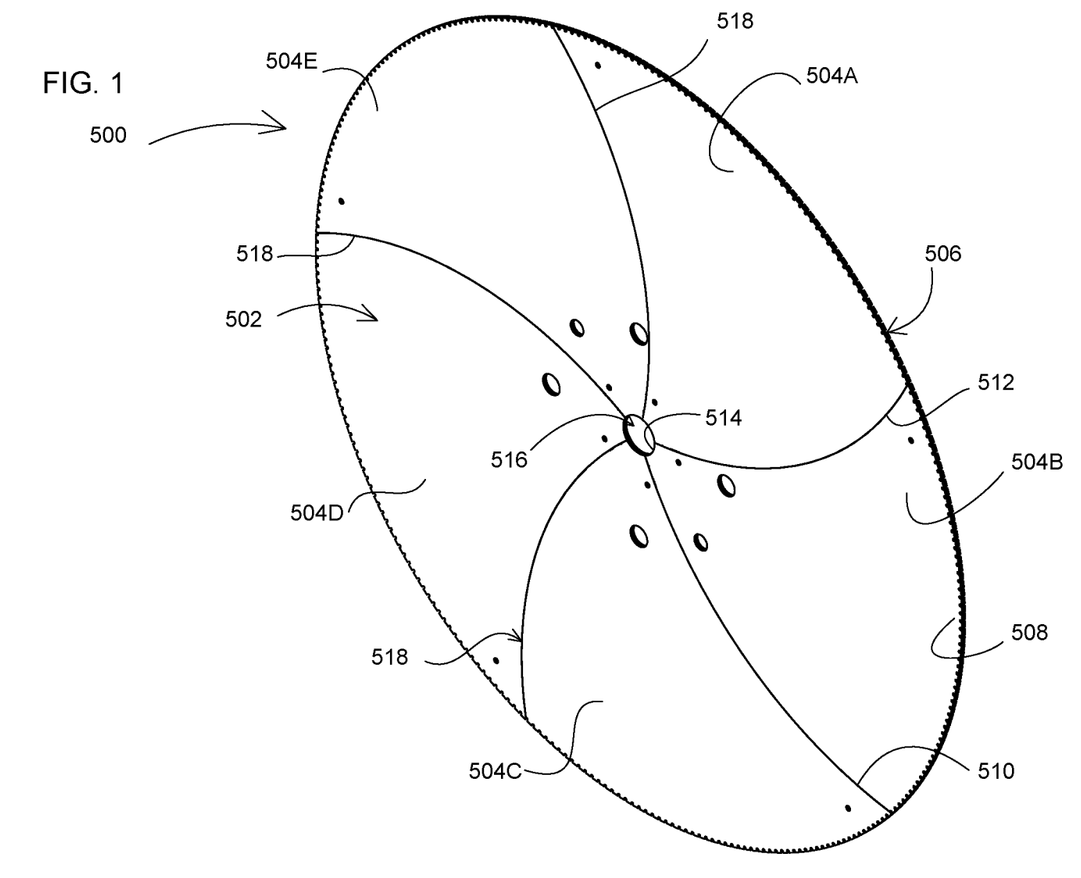
FIG. 1 is an isometric view of a laminar assembly in the form of a circular blade core.
Figures 2, 3:
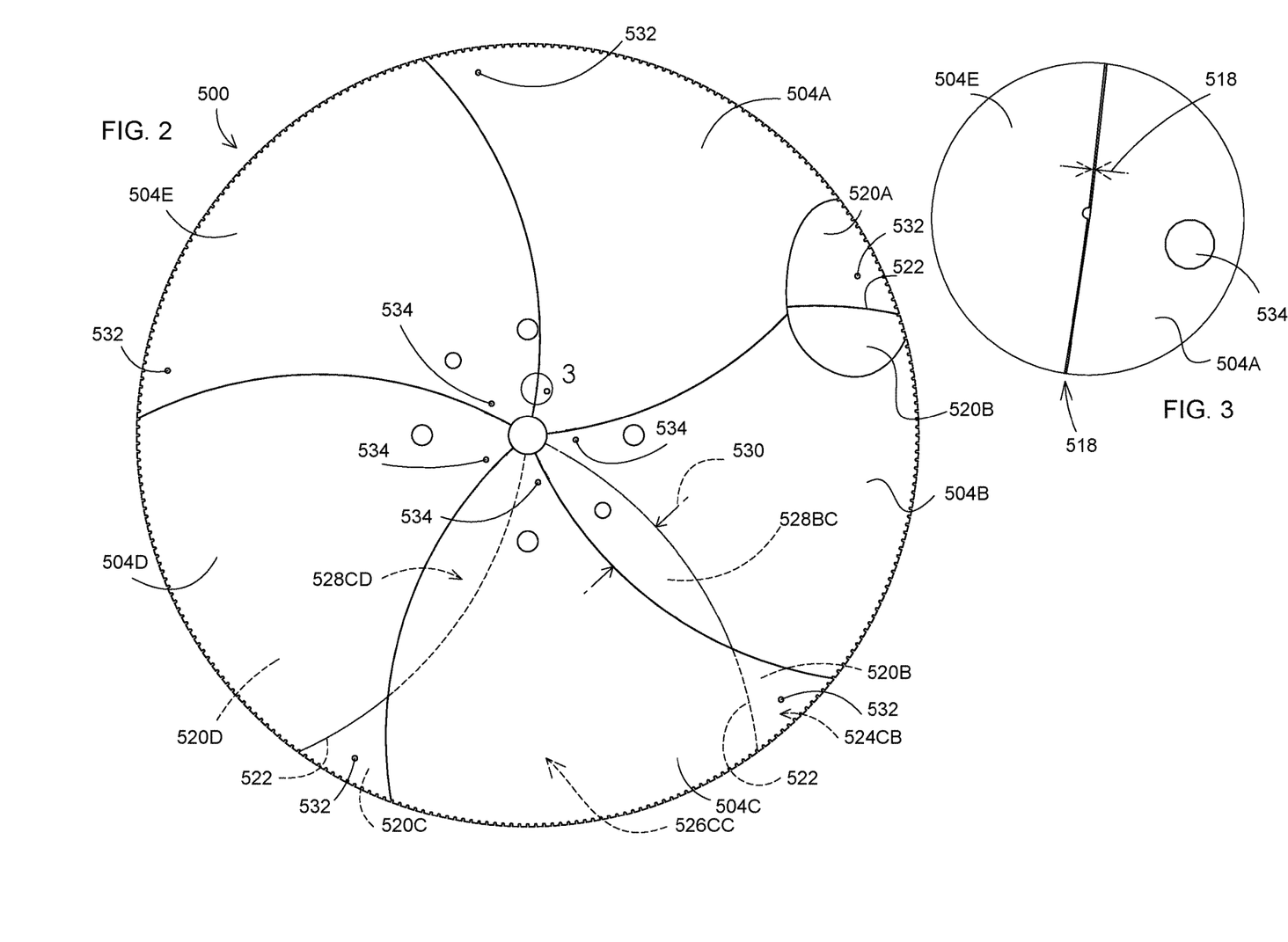
FIG. 2 is an elevation view and partial cutaway of the core of FIG. 1.
FIG. 3 is a detail view of a portion of the core of FIG. 2 taken at "3".

In one example of a laminar assembly, for example a working tool, which in the present example is a core 500 for a circular saw blade (FIGS. 1-2), the core 500 can have at least one layer 502, for example the layer visible in FIGS. 1 and 2, formed from a plurality of sections 504. In the present example, each of the sections are formed from the same material, for example a particular type of steel, but they may be formed from different materials, for example where the working tool might be noncircular. In the example illustrated, the core 500 includes the layer 502 formed from the plurality of sections 504 (5 in the present example), and also includes a similar layer 506, not fully visible in FIG. 1 on the side of the core opposite the layer 502, described more fully below. The layer 506 can also be a solid layer, layer formed from a different material, or a layer formed from sections other than those described herein. In the illustrated examples, the layers are both outer-most layers, and they are outer-most structural layers. The layers 502 and 506 can be secured together in a number of ways, including one or more of a suitable adhesive, fasteners, welds, or other securements. In the examples described herein, the layers 502 and 506 are secured together with a combination of adhesives and rivets, and while the adhesive is not shown in the illustrations, it is understood that at least a first layer of adhesive extends completely between or substantially completely between the layers 502 and 506. As used herein, "substantially" with reference to a quantity or property shall be defined as between plus and minus 10% of the quantity or property. The thickness of the adhesive layer can be determined according to that required for the particular application. It should also be understood that the core 500 as well as any other laminar assembly configured according to one or more of the features described herein can include more layers than the first layer 502, the adhesive layer, and the second layer 506. Such additional layers may be adhesive, sectioned layers, one-piece layers, for example conventional blade cores, and the like, and may be formed from the same or different materials than one or more of the other layers.

The core 500 in the present examples is formed from sections 504 that each have identical geometries. Each section 504 includes an outer perimeter edge 508, a leading side edge 510, and a trailing side edge 512. The terms leading and trailing are used herein to indicate relative spatial locations assuming a position moving in a clockwise direction, for example as shown in FIG. 1. While it is possible that the core 500 shown in FIG. 1 will be used to produce a cutting blade that is rotated in the clockwise direction as viewed in FIG. 1, making the side 510 leading the side 512, such need not be the case. The outer perimeter edge 508, when combined with all of the outer perimeter edges of all of the sections will define the perimeter of the core 500. In the present example, the core is a circular core, but other geometries can be used as well, including polygonal or complex geometries. Cutting elements, cutting material or other working surfaces (not shown) would be mounted, secured, bonded or otherwise fixed to the perimeter portion of the core 500. Example cutting elements may include diamond segments for concrete and the like, or carbide cutting elements for wood blades. Working surfaces would be mounted to the core in conventional ways. Each section also includes an inner side 514. All of the inner sides 514 of the corresponding sections in each layer, and an opening through the adhesive, produce a center opening 516, used for receiving a drive shaft or other mounting element. While the sections 504 are described and illustrated as extending from the center opening 516 to the perimeter 508, an individual section as contemplated herein can extend from the center opening less than the complete distance to the core perimeter, extend from the core perimeter less than the complete distance to the center opening, or may be completely interior to the core without being on the perimeter or the center opening of the core.

At least two adjacent sections 504, and in the present examples all of the sections in a layer, are separated from adjacent sections by a gap or spacing 518 (FIGS. 1-3). In the present examples, the gap 518 has a uniform geometry for all sections pairs, and in the illustrated examples, the gap 518 has a constant geometry from the center opening to the outer perimeter edges of the sections 504. While the gap 518 could be zero, so that the adjacent sections touch each other, either partly or over the entire extent of their adjacent edges, the gap 518 is nonzero from the opening to the outer perimeter edges. The depth of the gap 518 in the illustrated examples is the same as the thickness of the adjacent sections, so that adjacent sections are not touching over at least part of the extent of the gap, and in the present examples over the full extent of the gap. In the present examples, the adhesive layer along each gap 518 is exposed, or uncovered. Alternatively, one or more portions of adjacent sections can be contacting each other, for example at a given depth of the gap, or over a defined extent of the gap. However, having adjacent sections separated from each other by the gap 518 without the sections touching each other allows for thermal expansion of the sections, for example during manufacture, or during expected use, or allows movement of one section relative to an adjacent section, for example that which may be produced by continuous or repeated loading. A gap also allows changes that might occur in a section over time, such as by heating, loading or otherwise, to not affect adjacent sections. Such changes might occur, for example, due to anisotropic characteristics of a given section. In such a situation, if the sections 504 were cut from different sheets of material, or were cut from sheets of material without regard to any anisotropic characteristics inherent in the sheet, or if the sections were not all cut or produced from a sheet to have a known orientation with a characteristic of the material (such as anisotropic characteristics), one section might respond differently or in an unknown manner relative to another section, such as due to heating, vibration or loading. Therefore, a certain amount of movement in the plane of the layer of one section relative to an adjacent section will not adversely affect the adjacent section, depending on the movement and the form of the gap 518. Additionally, if a section were to move only out of the plane of the layer, a gap 518 of zero may also help to minimize or eliminate the effect of such movement on adjacent sections.

In one of the examples of a core 500 such as that illustrated in FIGS. 1-3, the gap 518 can range from 0.001 inch to 0.010 inch. Greater gaps can also be used. In one example, the gap 518 is approximately 0.005 inch, for example with a core having a diameter of approximately 20 inches, and in one configuration a diameter of about 20.30 inches. Additionally, the gap 518 can be configured to have a spacing between adjacent side edges of adjacent sections as a function of core diameter and/or section thickness. In the example of a 20.30 inch core diameter and an approximately 0.005 inch gap spacing, the gap spacing is approximately 0.02% of the core diameter. Other spacings can be used, and the spacing can vary according to distance from a center of the core, or the spacing can be varied randomly for a given gap 518, for example though not to exceed a defined spacing.

The spacing 518 in the example shown in FIG. 1 follows a constant radius arc from the center opening 516 to the outer perimeter, or has a constant radius of curvature. The sections 504 are cut or otherwise formed to have substantially the same constant radius of curvature, and where the gap 518 is constant, the radius of curvature of the gaps 518 are substantially the same as the radius of curvature of a given side edge of a section. In other examples, the sections can be formed as pie shapes with substantially straight, radially-extending side edges. Alternatively, the side edges can be formed with other geometric forms, such as a sawtooth form, sinusoid, square wave form, or complex waveform, or random side edges, and adjacent side edges can be complementary or non-complementary. Where adjacent side edges are complementary, the gap 518 will have a relatively uniform spacing, either constant where the dimensions and placement of adjacent side edges produce a constant gap, or varying where the dimensions and placement of adjacent side edges are such as to produce a varying gap.

In the illustrated examples, the core 500 has the layer 502 formed from five sections. The number of sections in a given layer can be selected from a wide range of numbers, and in part may be determined by the size of the core or other form of the assembly. It is desirable for the number of sections in a layer to be an odd number, for example to reduce the possibility of vibrations due to resonance, and the like. If desired, sections may be made smaller so that the contribution of any given section to expansion due to heating, or other geometry changes over time is less, or distributed more uniformly over the layer. However, smaller section sizes may be limited by overall requirements for the integrity of the layer. For example, a large number of smaller sections may result in reduced rigidity of the core assembly.

In the examples described herein, each of the sections is substantially planar. Each is formed by being cut from a flattened sheet of steel. In the present examples, each section remains substantially planar. In other examples, one or more sections can be embossed or otherwise formed to be non-planar if desired. Embossment can be configured and formed into a core or part of a core in ways described for example in WO2014/152,063, incorporated herein by reference. Multiple sections of embossed sections can be assembled to approximate an embossed layer such as those described in WO2014/152,063, or individual sections can be configured and embossed to approximate corresponding sectional areas in the layers described in WO2014/152,063.

Each of the sections 504 of the layer 502 is substantially identical to each other in geometry. Where they are identical in geometry and formed from the same material, though not necessarily from the same sheet of steel, for example, or not necessarily cut at the same orientation, the layer 502 can still provide added benefit relative to a laminar assembly formed from a plurality of monolithic discs, for example secured with an adhesive layer or layers. However, the layer 502 can have one or more sections different than one or more sections in the remainder of the layer, or each section can be different from each of the other sections. A section can be different in geometry, material, pre-treatment (for example tempering, tensioning, etc.), or in other characteristics or parameters, for example in strength orientation or crystallinity.

The laminar core assembly 500 shows six holes or apertures arranged in an annular configuration spaced from the center opening 516. These holes can be omitted, or they can be used for helping to secure the core on a driving tool, or for other purposes.

In the example core 500 of FIGS. 1-3, the second layer 506 is substantially identical to the first layer 502, and formed from respective sections 520 (FIG. 2), 5 in the present example. The configuration, geometry and assembly of the sections 520 in the second layer 506 are substantially identical to those described herein. Alternatively, the configuration, geometry and assembly of sections in a second or additional layer can be different, such as in ways described herein with respect to the first layer 502. The second layer 506 can also be a monolithic disc, or other layer, structural or otherwise. Additionally, other layers or components can be included in the assembly, and any given layer can have any of the forms described herein or that have been considered for use as a layer in a laminated working assembly.

The core assembly 500 has the first layer 502 as viewed in FIG. 1 with the gaps 518 extending in respective arcs directed in a counterclockwise direction. If the core assembly 500 is turned around in the present example so that the second layer 506 is visible, as viewed in the same direction as FIG. 1 is viewed, the appearance of the sections 520 and the respective gaps 522 (three of which are shown in FIG. 2) would be substantially the same as the depiction of the first layer 502 in FIG. 1. Whether or not the depictions are identical with the gaps 518 and 522 in identical positions will depend on the axis of the core about which the core is pivoted.

The core 500 in the present example has facing sections overlapping each other. The amount of overlap and the location of the overlap will be a function of the sizes of the sections, the curvature or other geometries of the side edges, the sizes of the gaps in the respective layers, and the relative arcuate location of the sections in one layer relative to the sections in the other layer. As illustrated in FIG. 2, one of the first sections 504B overlaps in part portions of three of the second sections 520A, 520B, and 520C (it is noted that the gap 522 between second sections 520B and 520C should be properly illustrated as a completely dashed line). The number of second sections that a given first section overlaps will depend on the geometry of the side edges and on the number of sections in a given layer, or the respective layers. For the section geometries and densities shown in FIGS. 1 and 2, section 504C overlaps a small semi-triangular portion 524CB of section 520B, a significant portion 526CC of the second section 520C and an enlarged disc portion 528CD of the second section 520D. Substantially identical overlaps occur with the other first sections 504 and respective ones of the second sections 520. The overlap in the present examples are determined by the positioning of the second layer 506 relative to the first layer 502, which positions are selected so that a gap between adjacent sections in one layer will bisect an inner side 514 of a facing section. In other words, a gap 518 or 522 will occur or be positioned at the center every "X" number of degrees, where "X" is determined by 360 degrees divided by the product of 2 times the number of sections in a layer, assuming both layers have the same number of sections. The sizes of the enlarged disc portions, such as disc portion 528BC, will be determined in part by the radius of curvature of the adjacent side edges of the sections, and the relative arcuate locations of the facing sections, with spacing 530 representing a spacing on one axis of one dimension of the enlarged disc. In the present example, the relative surface areas of overlap at 528BC and 524CB are of the same order of magnitude.

Facing sections can also be secured together by respective rivets 532 and 534, in addition to or instead of adhesive. In the present example, for a given section, each section is secured by respective rivets to each of two facing sections. For example, rivet 532 helps to secure first section 504C to second section 520B at the overlap 524CB, and the rivet 534 helps to secure first section 504C to second section 520C. Fewer or additional rivets or other fasteners or securing means can also be used to secure the facing sections in the assembly.

In another example of a layer that can be used to form a moving or working assembly, for example a core for a working tool, including the saw blade cores described herein, one or more of the sections in the core can have a configuration selected according to a known parameter or a section reference. The sections can then be used to produce a layer that is originally segmented, divided or separated into discrete pieces and then assembled and secured as necessary to form the assembly, for example using adhesive or other securement. In the present example of blades made from steel cores or steel layers, the cores or layers are produced by cutting from steel sheet. The steel sheets are formed from ingots through successive rolling operations to the desired thickness. However, the rolling operation produces in the resulting steel material characteristics wherein the strength of the material in one direction is different than that in another direction. For example, for a steel sheet 600 (FIG. 4) produced in successive rolling operations where the sheet 600 is passed through the rollers in the direction shown by arrow 602, the material has a greater strength in the direction of rolling relative to a transverse direction. Consequently, a circular core or layer cut from such a sheet will have different properties along one diameter compared to the properties of the material along another diameter, particularly a diameter perpendicular to the first.

Figure 4:
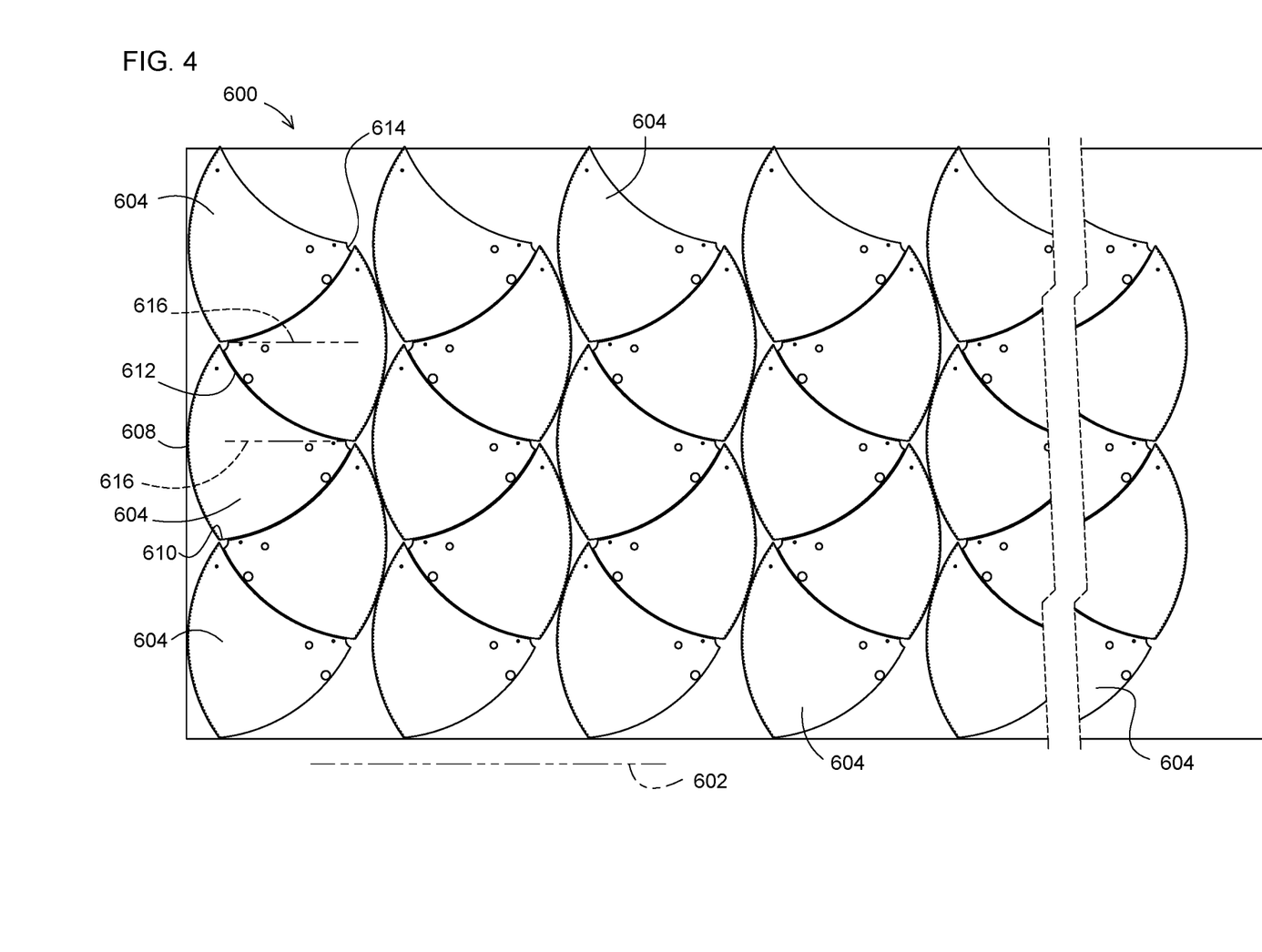
FIG. 4 is a top plan view and breakaway of a material sheet from which sections can be cut for producing a layer for the core of FIG. 1 or FIG. 6.
Figure 5:
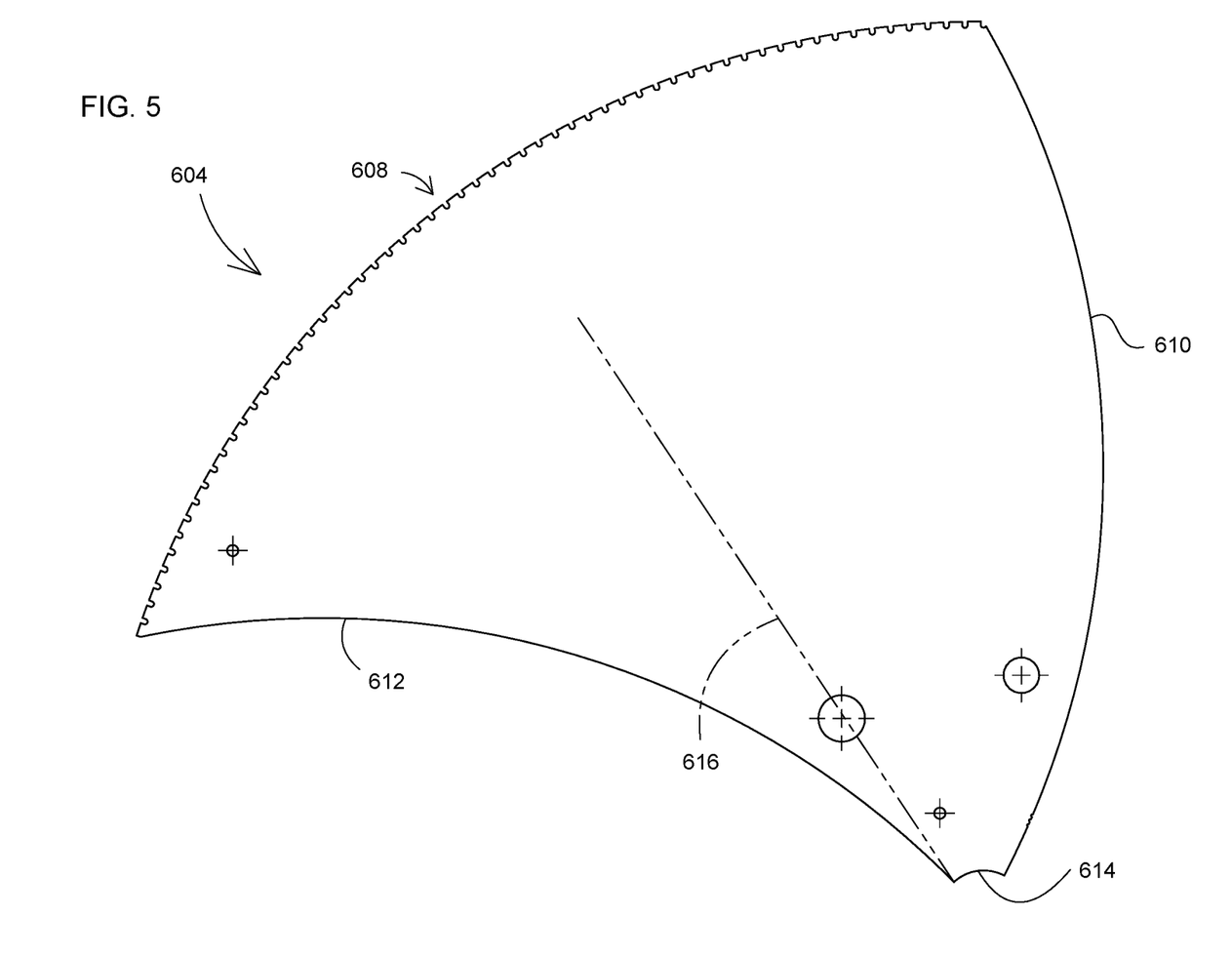
FIG. 5 is a plan view of a section for use in the core of FIG. 1 or FIG. 6.

In the present example, sections 604 are cut from a sheet 600 wherein at least one of the sections has a known orientation based on or relative to a known parameter or a known characteristic, a section reference, in the present case the direction of rolling 602 of the sheet or a strength direction of the material arising from the direction of roll. Other parameters or characteristics of a section or sections can be used for determining the configuration of one or more of the final sections. Parameters or characteristics of the section can be used to select a material thickness, the section geometry, and the position and orientation of the section in a final assembly, such as a blade core. The parameters or characteristics may also be used across a plurality of sections to produce an assembly of sections in a layer having a desired configuration. While it is possible that selecting one section according to a known parameter or characteristic improves the final assembly, consistently selecting a number of sections or all of the sections based on the section reference, or the known parameter or characteristic, can also improve the final assembly.

In the example illustrated, all of the sections 604 for a given layer are configured and cut from the sheet 600 based on the direction of roll 602 when the sheet was formed. Also in the present example, all of the sections 604 for an assembly are configured and cut from a sheet 600 based on the direction of roll when the sheet was formed, and used to produce layers for the assembly. The layers of sections are then assembled and secured together in the manner described with respect to FIGS. 1-3.

Each section 604 is configured to have a perimeter edge portion 608, a leading edge portion 610 and a trailing edge portion 612. Each section also includes a center wall 614. The layout, arrangement or pattern for cutting the sections 604 is selected so as to position a strength line 616 in each section in a desired orientation. In the present example, each section has its strength line 616 extending parallel to a line from approximately a corner of the center wall 614 in a direction to approximately bisecting the perimeter edge 608, and because it bisects the perimeter edge, it may be considered a center line of the section. Other orientations of the sections can be used. Additionally, other geometries for the side edges of the sections can also be used.

In the present example, all of the side edges of all of the sections to be used in a given assembly have the same radius of curvature. Therefore, sections for a working tool, for example for a core for a cutting blade, can be cut from a sheet of material, such as steel, and where the sections have curved side edges and the side edges have the same radius of curvature, the sections can be easily patterned and cut from the sheet. Additionally, the sections can be patterned so that the sections can be cut from a sheet using a common cut. Where the intended core is to be a circular core having a radius of curvature, the radius of curvature of the side edges can be the same as that for the perimeter of the core, and such a pattern can be used to reduce material waste. Additionally, in the present example, a pattern for the sections can be established where all sections in a layer can be cut from a single row of the sheet 600, if desired. Furthermore, the sections can be configured so that they can be cut from the sheet 600 with a common cut between adjacent sections. Additionally, the geometries in the configurations described herein can be used to significantly reduce waste material from the sheet 600.

The sections are cut from the sheet 600 in the conventional manner, such as by laser cutting, in the pattern illustrated in FIG. 4, and then processed as in conventional treatment methods, including tempering. A given layer is assembled for the core from the discrete sections, oriented or cut randomly or as desired, and in the present case oriented according to the strength lines inherent in the stock material. The core is then assembled from first and second layers of sections 604 with a layer of adhesive in a manner identical to that described with respect to the blade core of FIGS. 1-3, and everything discussed with respect to the blade core of FIGS. 1-3 applies in the same manner with respect to the present example except that the sections 604 are configured according to a known parameter or characteristic, namely a section geometry determined according to the strength lines of the sheet 600 of steel.

Figure 6:
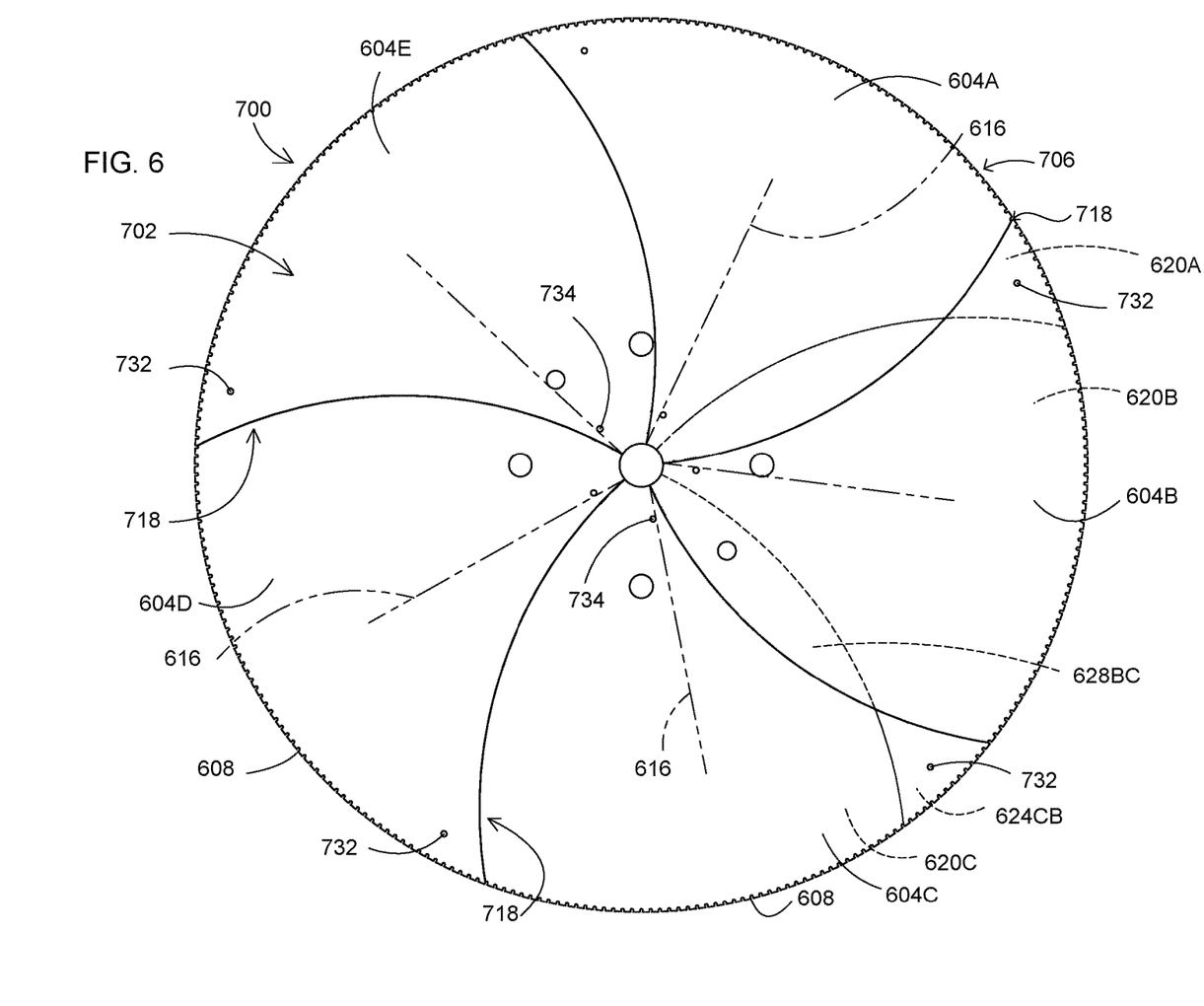
FIG. 6 is an elevation view of another example of a core.

In this example also, the arrangement or orientation of sections in one layer is used to configure the arrangement or orientation of sections in another layer. FIG. 6 shows a core 700 formed from a first layer 702 and having a second layer 706 (not shown), wherein each layer is formed from respective sections 604. The first and second layers are arranged with respect to each other in the same manner as described with respect to FIGS. 1-3. In the first layer 702, the sections are arranged so that adjacent sections include respective gaps 718, and the perimeter edges 608 combined to produce a perimeter that can receive and support cutting elements, such as diamond segments, carbide tips or the like.

In the example shown in FIG. 6, the sections are arranged so that the strength lines 616 are oriented approximately radially. Therefore, each of the five sections in each of the layers is oriented so that the strength direction of the material in each section extends parallel to the respective strength line 616 of that section. Each section of the blade core has identical properties in the selected direction or tool reference, in the present example in the radial direction, as each of the other sections in the layer, and also the other layer. The direction for each section can be selected as desired.

The sections in the first layer 702 are configured to overlap the sections in the second layer 706, such as sections 620A, 620B, and 620C, to produce a semi-triangular overlap 624CB and an enlarged disc overlap 628BC. Therefore, as with the configuration described with respect to FIGS. 1-3, each section 604 will overlap a small portion of one section, such as indicated at 620A, a larger portion of a second section such as indicated at 620B, and another portion of a third section, for example represented at 620C, which produces the overlap indicated by 628BC. Therefore, each section 604 on the first layer 702 overlaps portions of three sections from the second layer. Likewise, each section 620 in the second layer, the geometry and characteristics of which are identical to the section 604, overlaps portions of three sections from the first layer in the same configuration as the sections 604 in the first layer overlap the sections 620 in the second layer. The configuration of the first layer 702 (and also the configuration of the second layer 706 in this example) in which the sections are chosen to have the strength direction (section reference) in a known configuration for each section, and wherein the sections are arranged for a circular layer in a consistent manner (for example a tool reference), the layer (both layers in the present example) is more orthotropic than if one or more sections were not so configured. Additionally, a layer such as the first layer 702 would tend to be more orthotropic with a greater number of sections in the layer, and less orthotropic with a smaller number of sections in the layer.

In addition to adhesive between layers, facing sections are further secured with rivets 732 and 734 passing through all layers, in the same manner as with respect to the example of FIGS. 1-3, but it is possible in these examples to omit one or another form of securing the sections in a layer. The cores formed from the layers described herein can be processed without conventional tensioning or prestressing. Additionally, the six holes shown in the assembly in FIG. 6 can be omitted.

In another example of a core formed from multiple layers wherein the multiple layers are formed from sections, the layers can be secured and separated from each other by adhesive. In one example of a three layer assembly, the center layer can be identical to the configurations of the first layer in either FIG. 1-3 or 6 (502 or 702, respectively), and each of the outer layers can be identical to the second layer in either of FIG. 1-3 or 6 (506 or 706, respectively). In this configuration, the center layer and an outer layer have sections overlapping in the manner described herein with respect to the cores illustrated herein. Additionally, the sections in each of the outer layers can be aligned for overlapping so that the gaps between adjacent sections coincide with the gaps between adjacent sections in the other outer layer. However, the respective layers can have other orientations with respect to each other.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A layer for a tool body wherein the layer comprises a plurality of metal sections secured into fixed positions relative to each other to form the layer, wherein the layer is configured to form part of the tool body, and wherein adjacent sections of the plurality of metal sections are separated from each other by a gap, and wherein at least first and second metal sections of the plurality of the metal sections are positioned in the layer as a function of a material property characteristic and secured to a second layer.

2. The layer of claim 1 wherein a section in the plurality of sections includes a perimeter having a perimeter length, and wherein the gap between the section in the plurality of sections and an adjacent section is between 0.001% and 0.01% of the perimeter length.

3. The layer of claim 1 wherein the layer of sections forms a circular layer having a diameter, and wherein the gap between adjacent sections of the plurality of sections is between 0.01% and 0.1% of the diameter.

4. The layer of claim 1 wherein the gap is between 0.001 inch and 0.010 inch.

5. The layer of claim 1 wherein a section in the plurality of sections is separated from its adjacent sections in the plurality of sections along 100% of a perimeter of the section.

6. The layer of claim 1 wherein the plurality of sections in the layer are secured into fixed positions relative to each other by adhesive.

7. The layer of claim 1 wherein the sections in the plurality of sections are planar.

8. The layer of claim 1 wherein each of the sections in the plurality of sections has a geometry and wherein the geometries are identical.

9. A layer for a tool body wherein the layer comprises a plurality of metal sections secured into fixed positions relative to each other to form the layer, wherein the layer is configured to form part of the tool body, and wherein adjacent sections of the plurality of metal sections are separated from each other by a gap, and wherein a plurality of the metal sections are positioned in the layer as a function of a material property characteristic wherein the material property characteristic in each of the sections in the plurality of sections has an anisotropic characteristic and wherein the anisotropic characteristic is the same in each of the sections.

10. The layer of claim 9 wherein the anisotropic characteristic is a strength orientation or direction.

11. The layer of claim 9 wherein the anisotropic characteristic is a thermal expansion orientation or direction.

12. The layer of claim 1 wherein the layer has a layer geometry and the layer geometry has a reference, and wherein each of the sections in the plurality of sections is arranged in the layer as a function of the layer geometry reference.

13. The layer of claim 12 wherein the layer geometry is circular and the layer geometry reference is a center of the circular layer geometry, and wherein each of the sections in the plurality of sections is arranged as a function of a radius from the center of the circular layer geometry.

14. The layer of claim 13 wherein each of the sections in the plurality of sections has a geometry and wherein each geometry in the plurality of sections is oriented with respect to a respective radius in the circular layer geometry the same as the geometries in the others of the plurality of sections.

15. The layer of claim 13 wherein each of the sections in the plurality of sections has a strength characteristic, and wherein each of the sections in the plurality of sections is positioned in the circular layer geometry as a function of the radius.

16. The layer of claim 15 wherein the strength characteristic is oriented along a respective radius in the circular layer geometry.

17. The layer of claim 15 wherein the strength characteristic is oriented nonparallel to a respective radius in the circular layer geometry.

18. The layer of the layer of claim 17 wherein the strength characteristic is oriented perpendicular to a respective radius in the circular layer geometry.

19. The layer of claim 1 wherein the layer is a first layer, and further comprising a second layer.

20. The layer of claim 1 wherein the sections in the plurality of sections in the layer all have a plurality of arcuate edges having the same radii of curvature.

21. The layer of claim 1 wherein at least one section in the plurality of sections in the layer is non-planar.

22. A tool made with at least one layer as defined in claim 1.

23. A circular saw blade made with at least one layer as defined in claim 1.

24. A circular saw blade core formed from a plurality of layers, wherein at least a first outer structural layer is formed from a plurality of sections secured to an adhesive layer and wherein at least a part of first and second adjacent sections in the plurality of sections are separated by a gap.

25. The core of claim 24 wherein at least one section in the plurality of sections has a section property oriented in a direction relative to the blade core different from a section property in a second section in the plurality of sections.

26. The core of claim 25 wherein the at least one section has a strength direction, and the second section has a strength direction, and wherein the strength direction of the first and second sections point in different directions.

27. The core of claim 26 wherein the strength directions are oriented radially with respect to the core.

28. The core of claim 24 wherein the plurality of sections are formed from a single piece of raw stock.

29. The core of claim 24 wherein the plurality of sections all have an identical geometry.

30. The core of claim 24 wherein the plurality of sections each have an anisotropic feature oriented identically between the sections.

31. The core of claim 24 wherein each of the sections in the plurality of sections have a plurality of curved edge surfaces, all having identical radii of curvature.

32. The core of claim 24 wherein the section is formed from either of metal or fiber reinforced composite.

33. The core of claim 24 wherein each of the sections in the plurality of sections is asymmetric about a central axis and wherein each central axis of a section is aligned with a respective radius of the core.

34. The core of claim 24 further including a second layer formed from a plurality of second sections.

35. A method of assembling a layer of a tool core from sections, the method comprising assembling a plurality of sections into a layer to form an outer structural layer of the tool, with a first section adjacent at least a second section in the plurality of sections, wherein at least a part of adjacent first and second sections are separated from each other by a gap, and wherein the plurality of sections are secured into fixed positions for forming the layer.

36. The method of claim 35 further including for each of the first and second sections respective section references, and positioning the first and second sections in the layer as a function of the respective section references.

37. The method of claim 35 further including orienting the first and second sections according to a reference line for the tool core.

38. The method of claim 35 wherein the plurality of sections are assembled into a circular layer and wherein the first and second sections are oriented relative to respective radii.

39. The method of claim 35 wherein the layer is a first layer and further including laminating the first layer with a second layer of the tool core.

40. The method of claim 39 wherein the second layer is produced by assembling a plurality of second sections into the second layer, and further including positioning the second layer relative to the first layer according to the respective positions of the second sections in the second layer relative to the positions of the plurality of sections in the first layer.

41. The method of claim 35 further including positioning a section in the second layer to overlap a section in the first layer.

42. The method of claim 39 further including positioning a section in the second layer to overlap a plurality of sections in the first layer.

43. The method of claim 39 further including identifying a sheet property in a sheet of raw material, and cutting a plurality of sections from a sheet of raw material as a function of the identified sheet property.

44. The method of claim 43 wherein identifying a sheet property includes identifying a direction of sheet production.

* * * * *